UNITED STATES PATENT OFFICE.

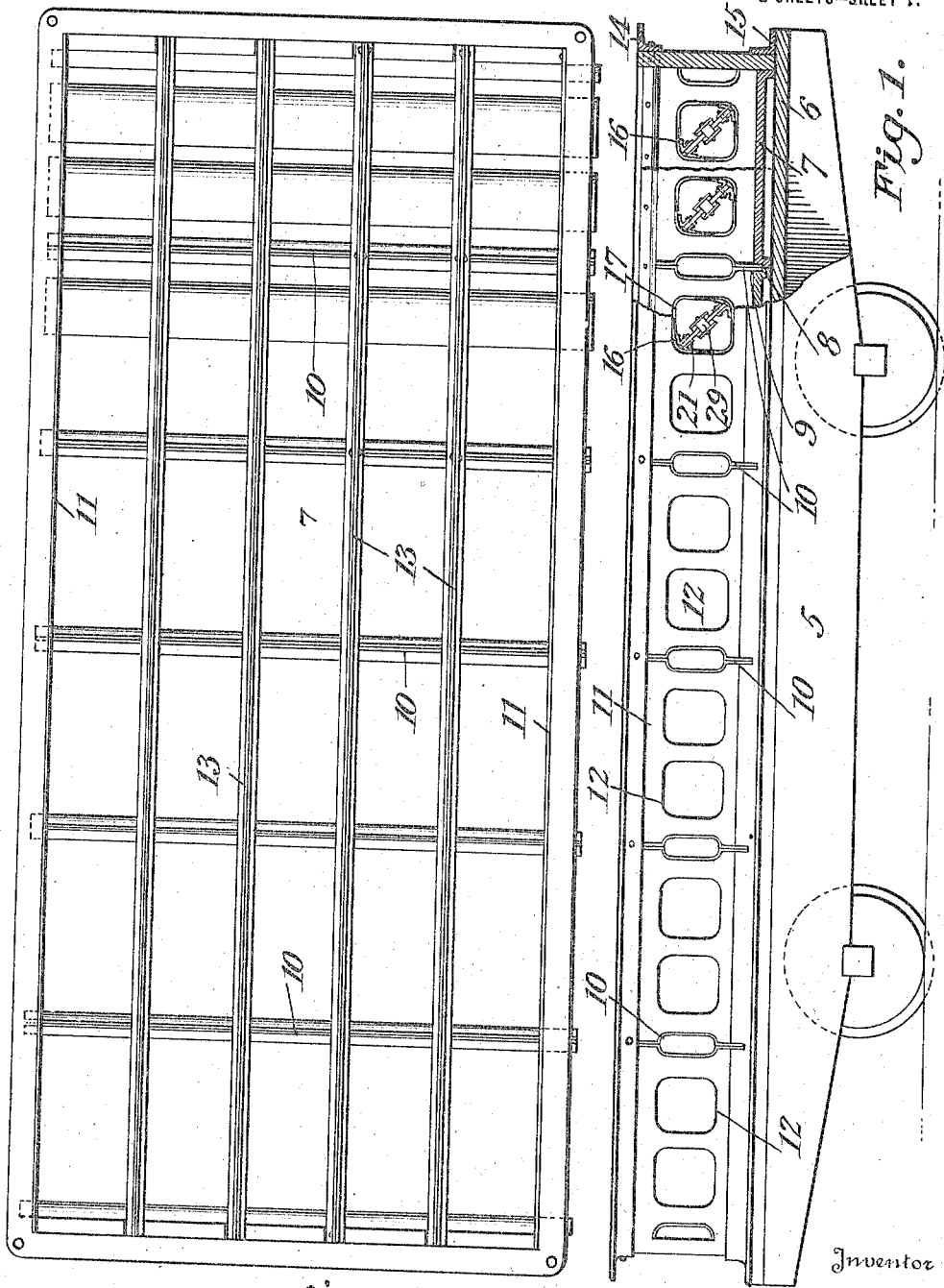

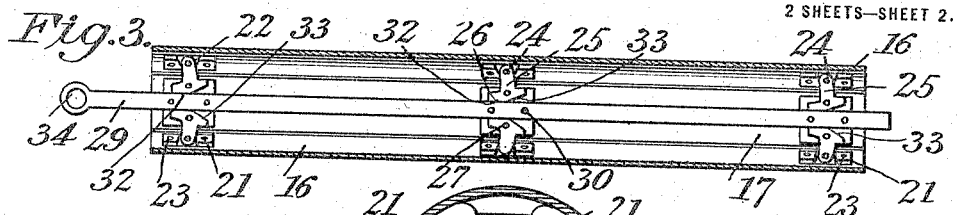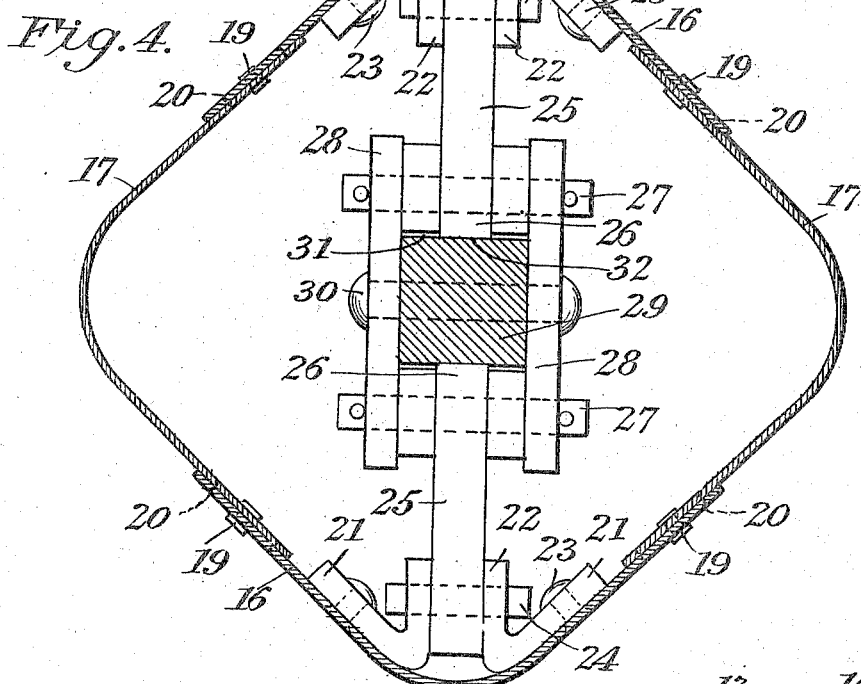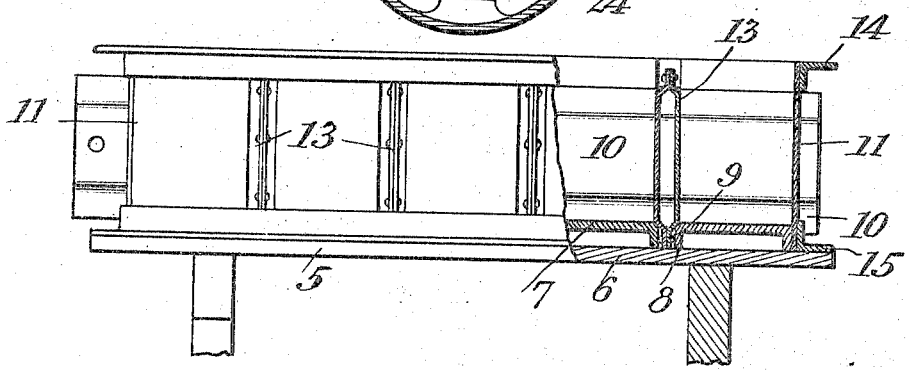

JOHN V. FISHER, OF PLYMOUTH, MICHIGAN.

APPARATUS FOR MOLDING BUILDING-BLOCKS.

1,249,942.  Specification of Letters Patent.  Patented Dec. 11, 1917.

Application filed April 2, 1917. Serial No. 159,259.

*To all whom it may concern:*

Be it known that I, JOHN V. FISHER, a citizen of the United States, residing at Plymouth, in the county of Wayne and State of Michigan, have invented certain new and useful Improvements in Apparatus for Molding Building-Blocks; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for molding building blocks.

The main object of the invention is the production of a block mold having sectional or demountable walls and a collapsible core having means for decreasing the diametrical extent of the core to permit its ready removal from the material within the confines of the walls of the mold.

Another object of the invention is to provide a device of this character which will mold simultaneously a multiplicity of blocks. Another object of the invention is to construct a device of this character in which the bricks or blocks may be removed without displacing or moving the molded blocks.

In the accompanying drawings which are made a part of this application,

Figure 1 illustrates a side elevation, partly in section, of a mold constructed in accordance with my invention.

Fig. 2 is a plan view.

Fig. 3 is a horizontal sectional view of the expansible core used in connection with the mold.

Fig. 4 is an enlarged detail sectional view thereof, and Fig. 5 is an end view of the mold, partly in section.

Reference now being had to the details of the drawings by numerals, 5 designates a flat car on which I have shown my mold, the numeral 6 indicating the base or bottom thereon. The mold base 6 comprises a number of independent sections 7, having downwardly extending flanges 8 forming supports for the respective base elements whereby they are supported above the surface of the car 5. The base sections 7 have at their adjacent faces cut out portions forming grooves 9 to receive the edges of the transverse partition walls 10, and support the same in an upright position while the molding operation is taking place.

The side walls of the mold comprise plates 11 having suitable apertures 12 for the reception of the collapsible core, to be hereinafter more specifically described. The side walls or plates 11, as well as the transverse partition walls 10 and longitudinal partition walls 13, are bolted together at their points of engagement in any suitable manner and to insure the side walls and partitions against lateral displacement, an upper ring 14 and lower ring 15 are provided. These rings 14 and 15 entirely encircle the upper and lower portions of the finished mold, the upper ring 14 being bolted thereto, while the lower ring is free from permanent connection with the mold elements to permit the mold and its partitions to be removed by a vertical lift thereof, without displacing or moving the molded blocks.

In the alining openings of the partitions 13 and side plates 11, the expansible cores, shown more particularly in Figs. 3 and 4, are positioned, the cores comprising curved end sections 16 and curved side sections 17, the sections 16 having pins 19 which extend through slots 20 of the sections 17 and provide an adjustable connection between the sections 16 and 17 to permit expansion and contraction of one element with the other.

Bolted to the sections 16 as at 23 are the irons 21 which are curved to conform to the contour of the sections 16, and these irons 21 have parallel extensions 22 which are apertured to receive trunnions 24 on which the outer ends of the respective links 25 are pivoted, the inner ends 26 thereof being pivotally supported on the trunnions 27 which are also pivotally connected to side plates 28, which in turn are connected to the operating rod 29 positioned centrally of the core by means of bolts 30.

The operating rod, 29, is preferably square in cross section, thereby providing substantially flat side faces 31, which are engaged by the flat faces 32 of the links 25, when the core is moved to its expanded position, thereby limiting the expansion of the same and preventing the links from being moved past a predetermined point, which would result in the collapsing of the core.

The faces 33, which are opposite the faces 32, are curved to allow a swinging movement of the links 25 in one direction, which movement being necessary to permit the contraction of the core during the removal thereof from the mold proper. One end of the operating rod 29 is provided with an opening or eye 34 to which may be applied any suitable power necessary to accomplish the contraction and expansion of the core.

In the operation of my device, the side walls and partitions are set up, as shown in Fig. 1, the cores positioned in the alining openings thereof, and expanded to closely engage the same. The plastic material is then poured in the mold and allowed to set and, after a predetermined period, the cores are contracted and removed with the result that continuous central ventilating openings are present in the finished blocks. The mold and blocks are then separated by merely moving the mold vertically with the result that the upper part of the mold leaves the finished blocks on the base sections, the blocks now being ready for use.

What I claim to be new is:—

In combination, in a mold, an expansible core made up of two curved sections, curved irons secured thereto, oppositely disposed curved sections having slots therein and means for holding the same in adjustable relation with the sections to which said irons are fixed, said irons having parallel projections which are apertured, trunnions mounted in said apertures, links pivotally mounted upon said trunnions intermediate said projections of the irons, plates and trunnions carried thereby upon which latter the inner ends of said links are pivoted, and an operating bar having pivotal connection with said plates.

In testimony whereof I hereunto affix my signature in presence of two witnesses.

JOHN V. FISHER.

Witnesses:
 MILTON E. WISELEY,
 E. K. BENNETT.

Copies of this patent may be obtained for five cents each, by addressing the "Commissioner of Patents, Washington, D. C."